US012701127B2

(12) United States Patent
Lyu et al.

(10) Patent No.: US 12,701,127 B2
(45) Date of Patent: Aug. 4, 2026

(54) DATA PROTECTION BASED ON INTRUSION DETECTION

(71) Applicant: International Business Machines Corporation, Armonk, NY (US)

(72) Inventors: Gang Lyu, Shanghai (CN); Jing Zhao, Beijing (CN); Fang Yuan Cheng, Beijing (CN); Fu Long Wang, Beijing (CN); Wei Gong, Beijing (CN); Yun Feng Ma, Bejing (CN)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 18/754,958

(22) Filed: Jun. 26, 2024

(65) Prior Publication Data

US 2026/0006038 A1    Jan. 1, 2026

(51) Int. Cl.
H04L 9/00        (2022.01)
H04L 9/40        (2022.01)

(52) U.S. Cl.
CPC .......... H04L 63/1416 (2013.01); H04L 63/10 (2013.01)

(58) Field of Classification Search
CPC ............................ H04L 63/1416; H04L 63/10
See application file for complete search history.

(56) References Cited

U.S. PATENT DOCUMENTS

| | | | |
|---|---|---|---|
| 9,306,956 B2 | 4/2016 | Dolph | |
| 9,509,771 B2 | 11/2016 | Abram | |
| 11,372,811 B1 * | 6/2022 | Ciubotariu ............ | G06F 21/565 |
| 11,657,155 B2 * | 5/2023 | Pendlebury ......... | G06F 21/6218 |
| | | | 726/23 |
| 11,829,257 B2 | 11/2023 | Trachy | |
| 11,847,026 B2 | 12/2023 | Kumarasamy | |
| 11,960,603 B2 * | 4/2024 | Bhave ................... | G06F 21/552 |
| 12,197,578 B1 * | 1/2025 | Brandwine .......... | G06F 21/554 |
| 2020/0104486 A1 | 4/2020 | Strogov | |
| 2020/0159624 A1 | 5/2020 | Malkov | |

FOREIGN PATENT DOCUMENTS

| | | |
|---|---|---|
| CN | 102210133 B | 10/2014 |
| EP | 3991073 B1 | 7/2023 |
| TW | 201633205 A | 9/2016 |
| WO | 2021034695 A1 | 2/2021 |

OTHER PUBLICATIONS

Stonefly, How to Set Up Immutable Snapshots for Ransomware, downloaded Jan. 25, 2024, from https://stonefly.com/blog/how-to-set-up-immutable-snapshots-for-nas/, 12 pages.
Wikipedia, Snapshot (computer storage), downloaded Jun. 20, 2024 from https://en.wikipedia.org/wiki/Snapshot_(computer_storage), 3 pages.
Wikipedia, Intrusion detection system, downloaded Jun. 20, 2024 from https://en.wikipedia.org/wiki/Intrusion_detection_system, 14 pages.

* cited by examiner

*Primary Examiner* — Syed M Ahsan
(74) *Attorney, Agent, or Firm* — Seed Intellectual Property Law Group LLP

(57)            ABSTRACT

A determination is made of whether a network attack is suspected. In response to determining that the network attack is suspected, a generation of a snapshot of volumes of data is requested via a low latency link. The snapshot of the volumes of data is generated while the volumes of data are blocked from access and prior to an occurrence of an effect of the network attack on the volumes of data.

16 Claims, 6 Drawing Sheets

DATA PROTECTION BASED ON INTRUSION DETECTION

BACKGROUND

The present invention relates generally to the electrical, electronic and computer arts and, more particularly, to network management.

Conventional network intrusion detection systems include a variety of systems and methods for detecting and mitigating network attacks. For example, anti-malware scanning tools analyze disks and detect whether a system is under network attack. Intrusion detection systems (IDSs) detect malicious behavior by monitoring the network (including monitoring network traffic). Memory analysis techniques monitor and collect system status information to determine whether a system is under network attack. Malware detection identifies malicious activity, including malicious activity conducted via a network.

SUMMARY

Principles of the invention provide systems and techniques for data protection based on intrusion detection. In one aspect, an exemplary method includes the operations of determining whether a network attack is suspected; in response to determining that the network attack is suspected, requesting, via a low latency link, a generation of a snapshot of volumes of data; and generating the snapshot of the volumes of data while the volumes of data are blocked from access and prior to an occurrence of an effect of the network attack on the volumes of data.

In one aspect, a computer program product comprises one or more tangible computer-readable storage media and program instructions stored on at least one of the one or more tangible computer-readable storage media, the program instructions executable by a processor, the program instructions comprising determining whether a network attack is suspected; in response to determining that the network attack is suspected, requesting, via a low latency link, a generation of a snapshot of volumes of data; and generating the snapshot of the volumes of data while the volumes of data are blocked from access and prior to an occurrence of an effect of the network attack on the volumes of data.

In one aspect, an apparatus comprises a memory and at least one processor, coupled to the memory, and operative to perform operations comprising determining whether a network attack is suspected; in response to determining that the network attack is suspected, requesting, via a low latency link, a generation of a snapshot of volumes of data; and generating the snapshot of the volumes of data while the volumes of data are blocked from access and prior to an occurrence of an effect of the network attack on the volumes of data.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

mitigation of network attacks on storage systems by using low latency connections (links) (such as peripheral component interconnect express (PCIe) connections) to alert storage systems of an impending network attack and to enable the storage systems to protect the relevant data before malicious commands associated with the network attack are transported to the storage systems by other connections (such as fiber channel connections);

settable priorities for snapshot commands, which provide high priority for sending snapshot commands for storage volumes associated with important tasks, thereby protecting key tasks and businesses, and which provide high priority for sending snapshot commands for storage volumes with the greatest possibility of being attacked, thereby protecting the data against attack in a prompt way; and ability to capitalize on the advantage of low latency links to quickly send a snapshot request to storage systems such that the stored data can be protected from a network attack.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
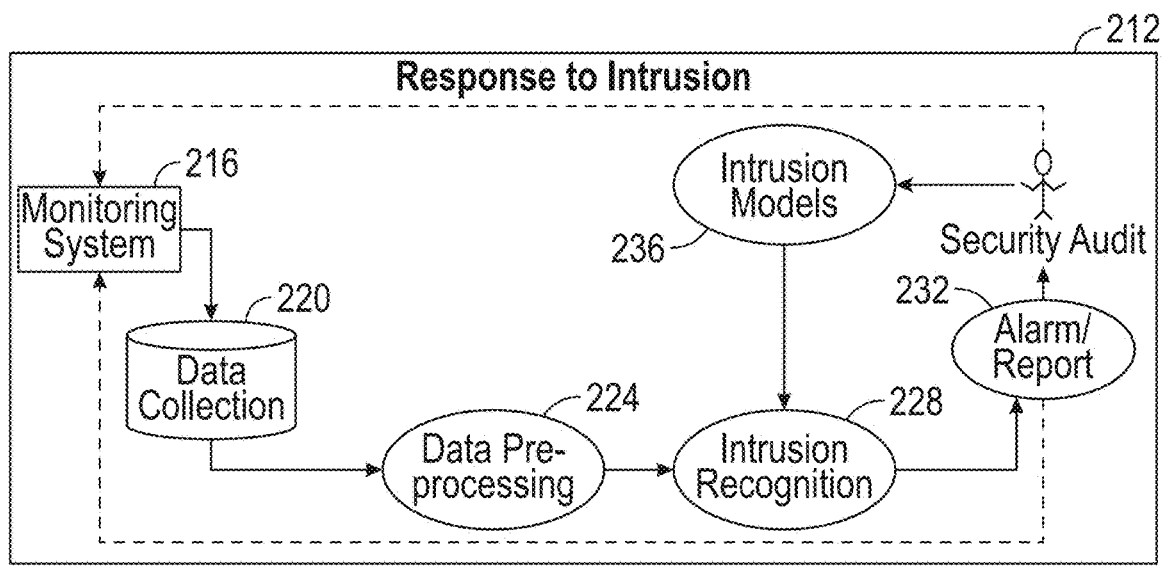
FIG. 1 is a block diagram of an intrusion detection process, in accordance with example embodiments.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims.

That is, no limitations with respect to the embodiments shown and described herein are intended or should be inferred.

Conventional intrusion detection systems (IDSs) detect and intercept threat attacks when a system is attacked via a network. Typically, the storage subsystems of the system under attack do not have or receive information related to the attacks; the security tasks, including protection of data (the data protection task), rely only on systems such as the IDS. The data protection task, however, typically does not have the ability to quickly perform data protection tasks on the storage system.

In one example embodiment, in response to detecting a network-based attack, alert messages are sent via fast communication channels to alert the storage systems that the system is under attack. In response, the storage systems create backups of data (snapshots) that can be restored should the attack corrupt the stored data. In one example embodiment, a snapshot of the data in a consistency group is captured when an attack is detected. The snapshot commands are transmitted via one or more low latency connections (links), such as peripheral component interconnect express (PCIe) connections, to the storage systems, to ensure that the snapshot commands arrive at the storage systems sooner than the commands and data associated with the attack are transported to the storage system (by, for example, other connections, such as fiber channel connections). This improves the probability that the data captured by the snapshot is preserved and not maliciously modified by the attack.

Regarding consistency groups, it is noted that applications typically have their data spread over multiple storage volumes. If a snapshot is to be used to capture data for multiple volumes, all of these volumes should be at a consistent level prior to capturing the snapshot. Snapshot consistency groups can be used to help create a consistent point-in-time copy across multiple volumes, and even across multiple storage systems, to maintain the order of dependent writes. (If the start of one write operation depends upon the completion of a previous write operation, the writes are dependent.) In one or more embodiments, the chronological order of dependent writes to the volumes is the basis for providing consistent data to the snapshots. With the snapshot consistency group option, the storage system holds off input/output (I/O) activity to a volume by putting the volume into an extended long busy (ELB) state. Thus, a condition is created during which the dependent write updates do not occur, and the snapshot uses that time to obtain a consistent point-in-time copy of the related volumes. I/O activity resumes when the storage system is informed that the snapshot of the snapshot consistency group is completed.

Intrusion Detection Process

FIG. 1 is a block diagram of an intrusion detection process 212, in accordance with example embodiments. The intrusion detection process 212 includes event generators, event analyzers, response units and event databases. In one example embodiment, a monitoring system 216 collects information regarding host systems and stores the information in a data collection database 220. The collected data is pre-processed (operation 224) and the pre-processed data is analyzed to perform intrusion detection based on conventional intrusion models 236 (operation 228). In response to the detection of a network attack or other intrusion, an alarm and/or report is issued (operation 232).

Storage Systems with Low Latency Links

Figure 2:
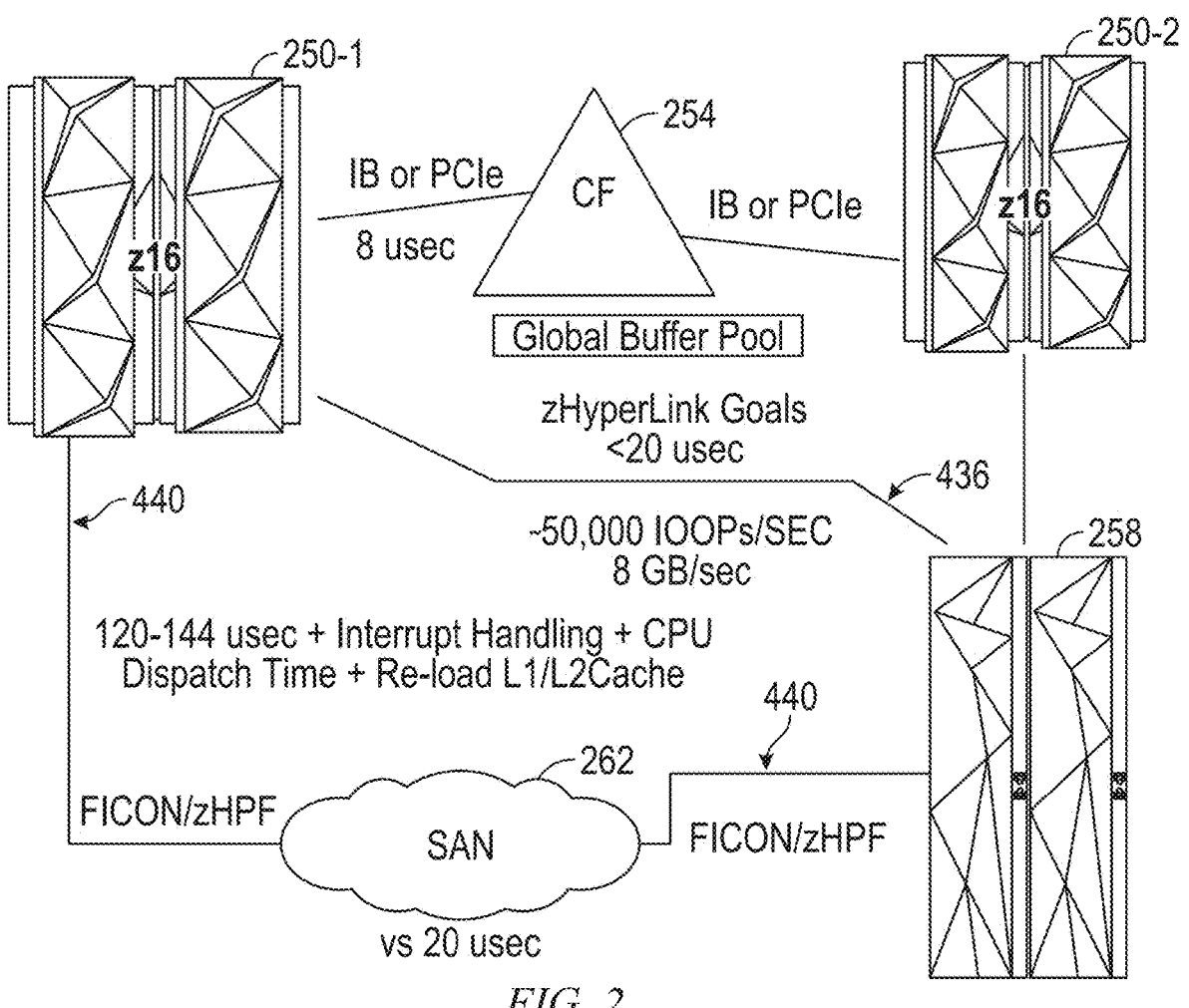
FIG. 2 is a block diagram of a storage system, in accordance with example embodiments.

FIG. 2 is a block diagram of a storage system, in accordance with example embodiments. In the storage system of FIG. 2, a coupling facility (CF) 254 provides connectivity between, for example, a host server 250-1 and a host server 250-2 to create a server cluster. Low latency links 436 provide extremely low latency communications between, for example, the host server 250-1 (such as a mainframe computer) and a storage system 258, and dramatically reduces latency by interconnecting the mainframe computer 250-1 directly to the input/output (I/O) bay of the storage system 258.

The low latency links 436 are fast enough to transport commands to arrive at the storage system 258 sooner than the commands and data transported to the storage system 258 by, for example, a storage area network 262 and other connections, such as fiber channel connections 440. The low latency links 436 transparently provide applications, such as Database 2 (DB2) applications, with fundamentally smaller latency than applications on platforms without such low latency links 436 (excluding applications that reside within the memory database).

In one example embodiment, commands are issued to capture snapshots of all data determined to be at risk, such as data within the consistency groups associated with the network attack. The snapshot commands are sorted according to the degree of the attack(s), the priority of the data being attacked, or both. For example, an attack on an operating system may be identified by an intrusion detection system as being a more severe attack than an attack on software that generates a log report. Similarly, critical data is identified as a higher priority than log data. The snapshot commands may be sorted prior to transmission, sorted by the storage system 258 after reception, and the like.

The snapshot commands are transmitted to the storage systems 258 via fast channels (such as the low latency links 436) upon detection of an attack on or intrusion into the host server 250-1. As noted above, the snapshot commands are transmitted via the low latency links 436, which are faster than the storage area network (SAN) 262 and other conventional channels, such as the fiber channels 440, to ensure their expedited arrival at the storage system 258. This improves the likelihood that the data under attack is protected and remains unaltered by the attack. (It is noted that snapshot commands are also assigned a high priority for execution within the storage system 258.)

Figure 3:
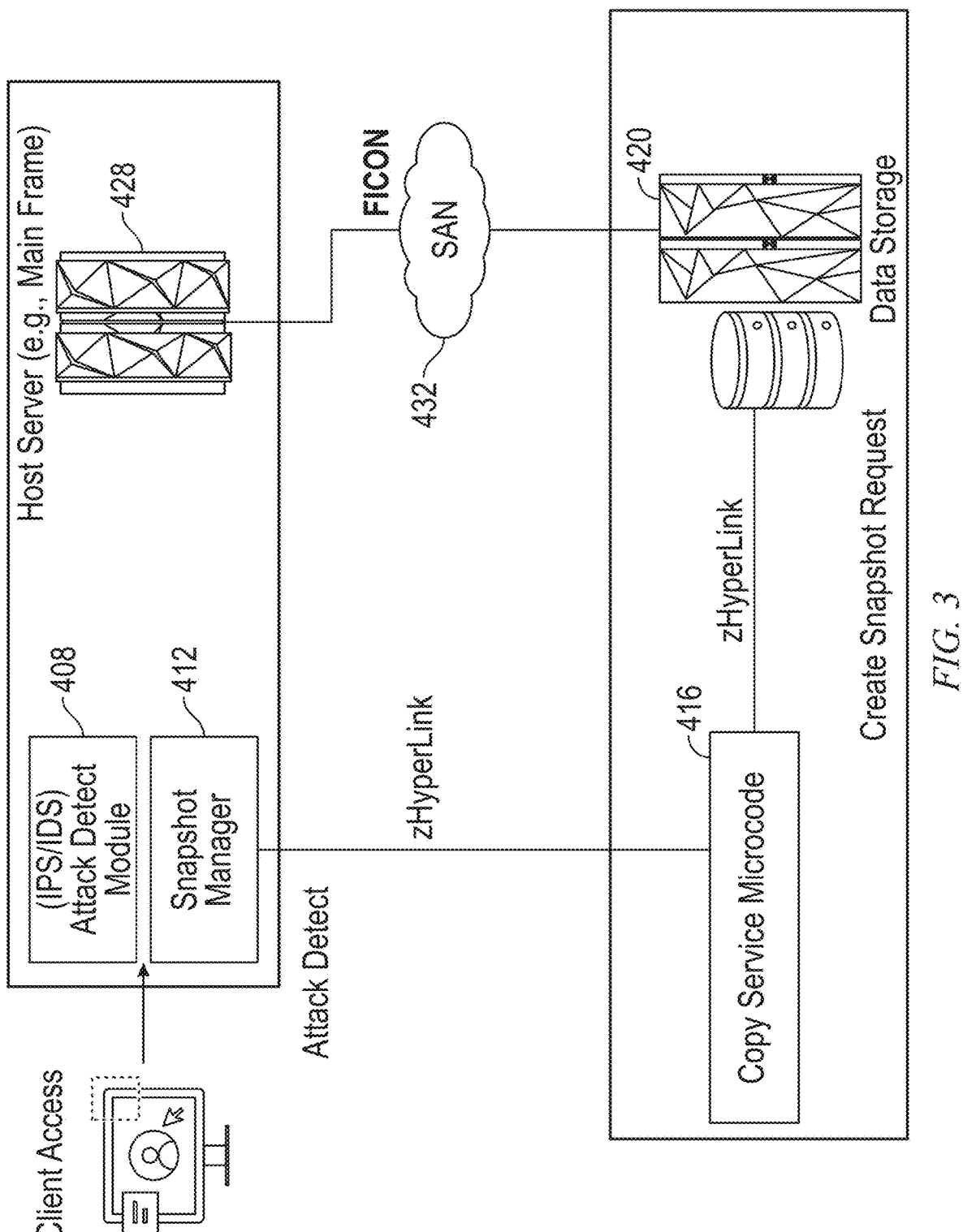
FIG. 3 is a block diagram of an example architecture for detecting and mitigating network attacks, in accordance with example embodiments.

FIG. 3 is a block diagram of an example architecture for detecting and mitigating network attacks, in accordance with example embodiments. In one example embodiment, a policy control module includes an attack detection module 408 that monitors for and detects network attacks, including intrusion attacks on a network. In response to the detection of an attack, a snapshot manager 412 issues requests to copy service microcode 416 to create snapshots of the data under attack. The copy service microcode 416 blocks input/output via the data storage system 420 and generates a snapshot(s) of the data identified in the snapshot command. For example, a snapshot of all the data within the volumes of a consistency group may be taken.

Figure 4:
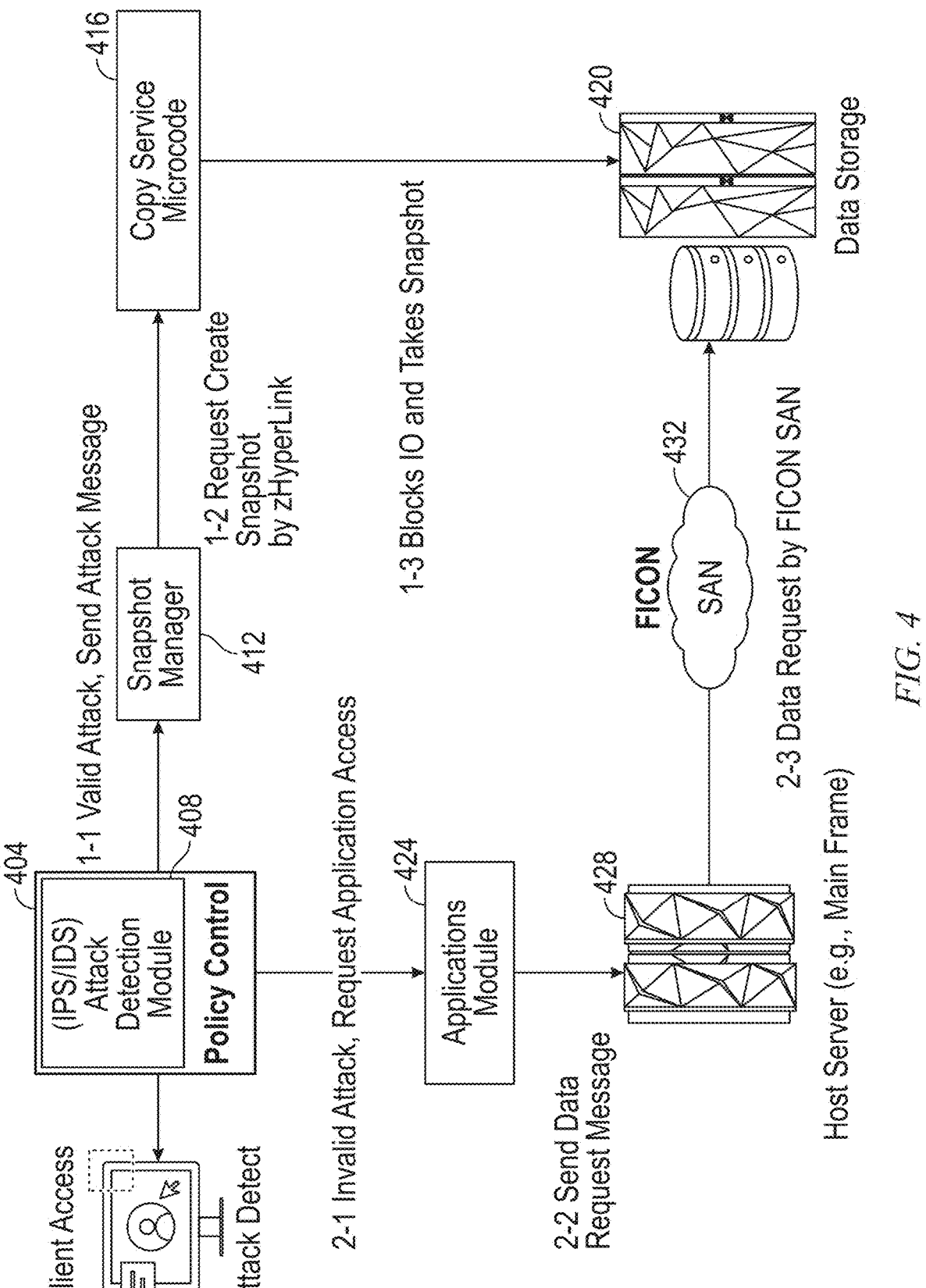
FIG. 4 is a block diagram of an example workflow for detecting and mitigating network attacks, in accordance with example embodiments.

FIG. 4 is a block diagram of an example workflow for detecting and mitigating network attacks, in accordance with example embodiments. In one example embodiment, an attack is detected by the attack detection module 408 of the policy control module 404. The skilled artisan will be generally familiar with intrusion detection systems (IDS), which are also known as intrusion prevention systems (IPS), and, given the teachings herein, will be able to implement attack detection module 408 and policy control module 404 using software and/or device-based techniques.

In response to the detection of a valid attack, the policy control module 404 informs the snapshot manager 412 of the network attack. The snapshot manager 412 requests that the copy service microcode module 416 creates a snapshot(s) of the data to be protected. The copy service microcode module 416 blocks input/output of the data storage system 420 and triggers the creation of the snapshot(s). As will be appreciated by the skilled artisan, a "snapshot" is the state of a system at a particular point in time. The skilled artisan will be generally familiar with controlling the generation of snapshots using volume managers, file systems, and the like, and, given the teachings herein, will be able to implement a software-based snapshot manager 412 and copy service microcode module 416.

In response to a data access request without a detection of an attack, the policy control module 404 requests that an applications module 424 provide access to the storage system 420. Applications module 424 represents a variety of different types of application software (e.g., database management system) that can be run on a computer system protected in accordance with aspects of the invention. The applications module 424 sends a data request message to the host server 428 and, in return, the host server 428 issues a request for the identified data via a fiber connection (FI-CON) and the SAN 432 to the data storage system 420. The skilled artisan will be generally familiar with conventional SANs and data storage systems and, given the teachings herein, will be able to implement SANs 432 and data storage systems 420 in accordance with example embodiments.

Figure 5:
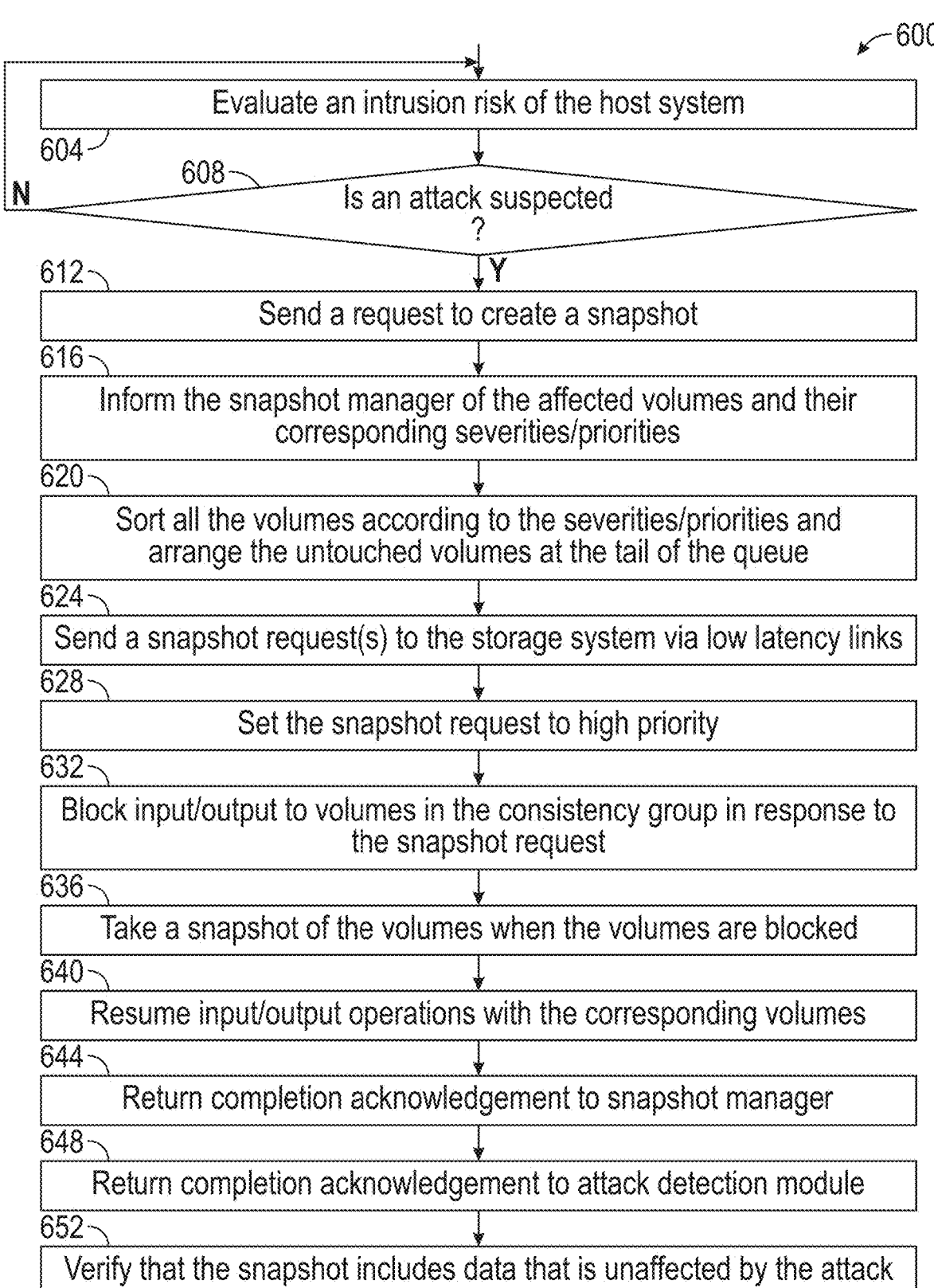
FIG. 5 is a flowchart for detecting and mitigating network attacks, in accordance with an example embodiment.
Figure 6:
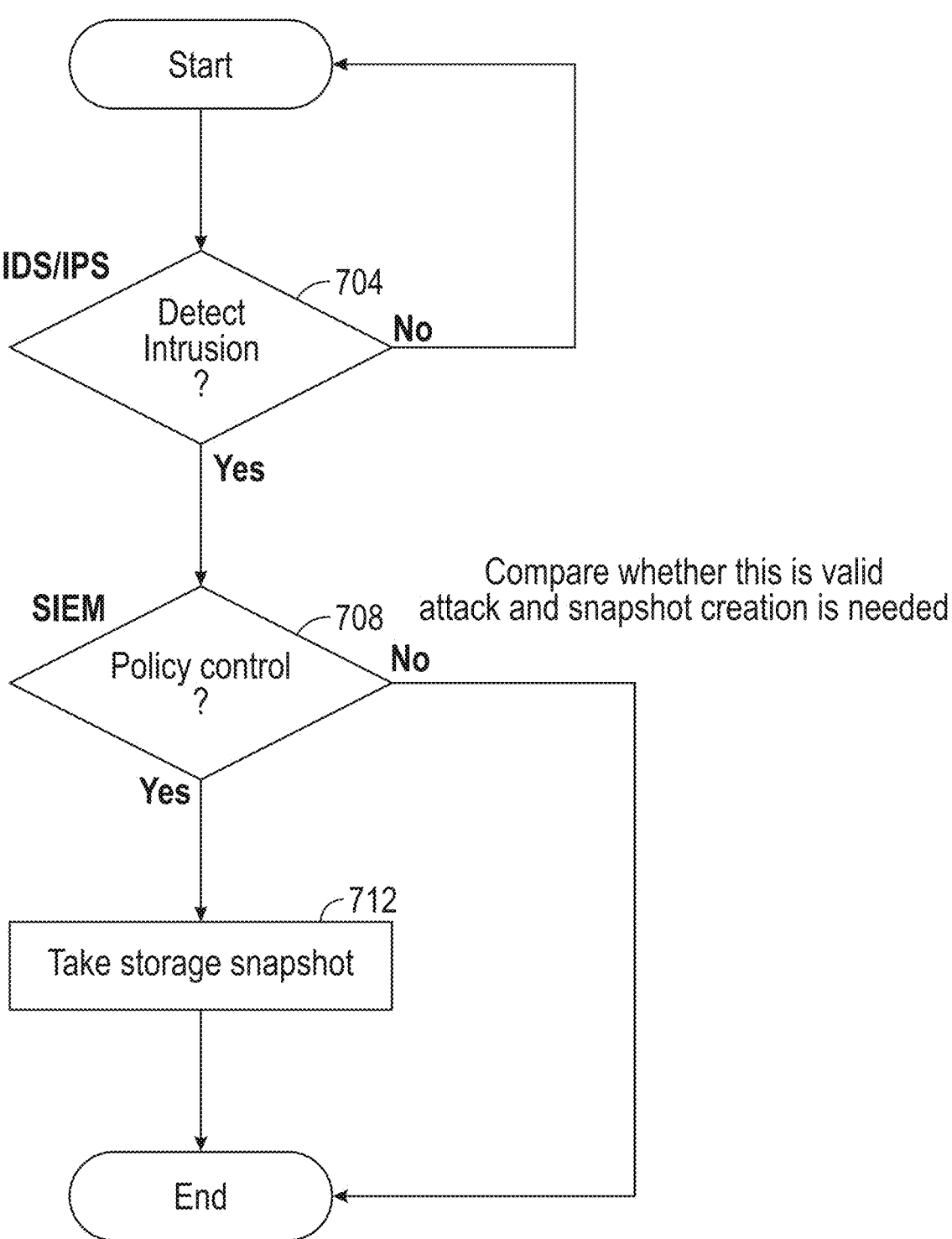
FIG. 6 is a block diagram of an example high-level workflow for detecting and mitigating network attacks, in accordance with example embodiments.

FIG. 5 is a flowchart 600 for detecting and mitigating network attacks, in accordance with an example embodiment. In one example embodiment, the attack detection module 408 continuously evaluates an intrusion risk of the host system 428 (operation 604). In one example embodiment, machine learning is used to detect the risk in a prompt way. A check is performed to determine if an attack is suspected (operation 608). If the attack detection module 408 determines that an attack is suspected (such as follows a given control policy for confirming that an attack is to be treated as a valid attack) and that the creation of a snapshot is needed, the attack detection module 408 requests that the snapshot manager 412 sends a request to generate the snapshot (operation 612). The attack detection module 408 also informs the snapshot manager 412 of the volumes of data affected by the attack and their corresponding attack severities, data priorities, and the like (operation 616). The snapshot manager 412 sorts the volumes of data on the storage system 420 corresponding to the relevant sessions according to the severities, priorities, and the like, and the volumes not under attack are arranged at the tail of a queue of commands for the storage system 420 (operation 620). (The sorting and arranging of the volumes impact the time to create the snapshots as the created snapshot commands are sent to the storage systems 420 sequentially. Thus, the commands at the head of the commands queue are executed earlier than those at the tail of the queue. The volumes with important data are granted high priority to send the corresponding snapshot commands, thereby protecting the key data and key businesses. The volumes with the greatest possibility of being attacked are granted high priority to send the corresponding snapshot commands, thereby protecting the data against attack in a prompt way.)

The snapshot manager module 412 sends the snapshot request to the storage system 420 in the sorted order by the low latency links 436 (PCIe connection) (operation 624). The request includes one or more of a consistency group identifier(s), volume numbers, and the like. The snapshot request is set to high priority in the storage system 420 (operation 628). The copy service microcode 416 in the storage system 420 blocks inputs to and outputs from (I/O's) the volumes of data under attack in response to receiving the snapshot request(s) (operation 632).

The copy service microcode 416 takes a snapshot of the relevant volumes of data while the volumes are being blocked (operation 636). The storage system 420 resumes I/Os to the corresponding volumes once the snapshot has been completed (operation 640). The storage system 420 returns the completion acknowledgement to the snapshot manager module 412 (operation 644) and the snapshot manager module 412 returns the completion acknowledgement to the attack detection module 408 (operation 648). While recovering the data from the snapshot after an attack, the host application verifies that the snapshot contains data that is unaffected by the attack (operation 652).

Example Snapshot Commands

Applications typically have their data spread over multiple volumes. Thus, if a fast copy technique is to be used for multiple volumes, all of these volumes should be at a consistent level. Consistency groups can be used to help create a consistent point-in-time copy across multiple volumes, even across multiple storage systems 420, thus maintaining the order of dependent writes. (As used herein, a "consistent point-in-time copy" implies that the order of dependent writes is preserved in the data copy and "consistent volumes" means the order of dependent writes to all of the associated volumes is preserved at the specified point in time (if a snapshot is taken at that point in time, the snapshots are therefore also consistent).) With the consistency group option of conventional fast copy techniques, the storage system 420 holds off I/O activity to a given volume by putting the source volume in an extended long busy (ELB) state. Thus, a condition is created during which the dependent write updates do not occur, and the fast copy technique uses that time to obtain a consistent point-in-time copy of the related volumes. I/O activity resumes when the storage systems 420 are informed that the consistency group of the fast copy technique is completed. If the fast copy of the consistency group is not completed before the ELB timer expires, it is reset automatically by the storage system 420; a default ELB timer may be 120 seconds for count-key-data (CKD) logical control units (LCUs) and 60 seconds for fixed-block architecture (FB) layer setting services (LSSs). Thus, the script or job needs to include some verification of the consistency group to ensure that the ELB timer does not expire before completion of the fast copy to ensure that the data is write dependent consistent.

In one example embodiment, an establish command of the fast copy technique with the consistency group option results in an ELB for the source volume. However, the consistency group complete option is at the LSS level. Therefore, if there are multiple consistency groups to capture that might share an LSS, it must either be ensured that the tasks are not run concurrently, or care must be taken that all of the tasks complete their establish commands before the consistency group completion is done, to release the ELB for all volumes in the LSS.

Figure 7:
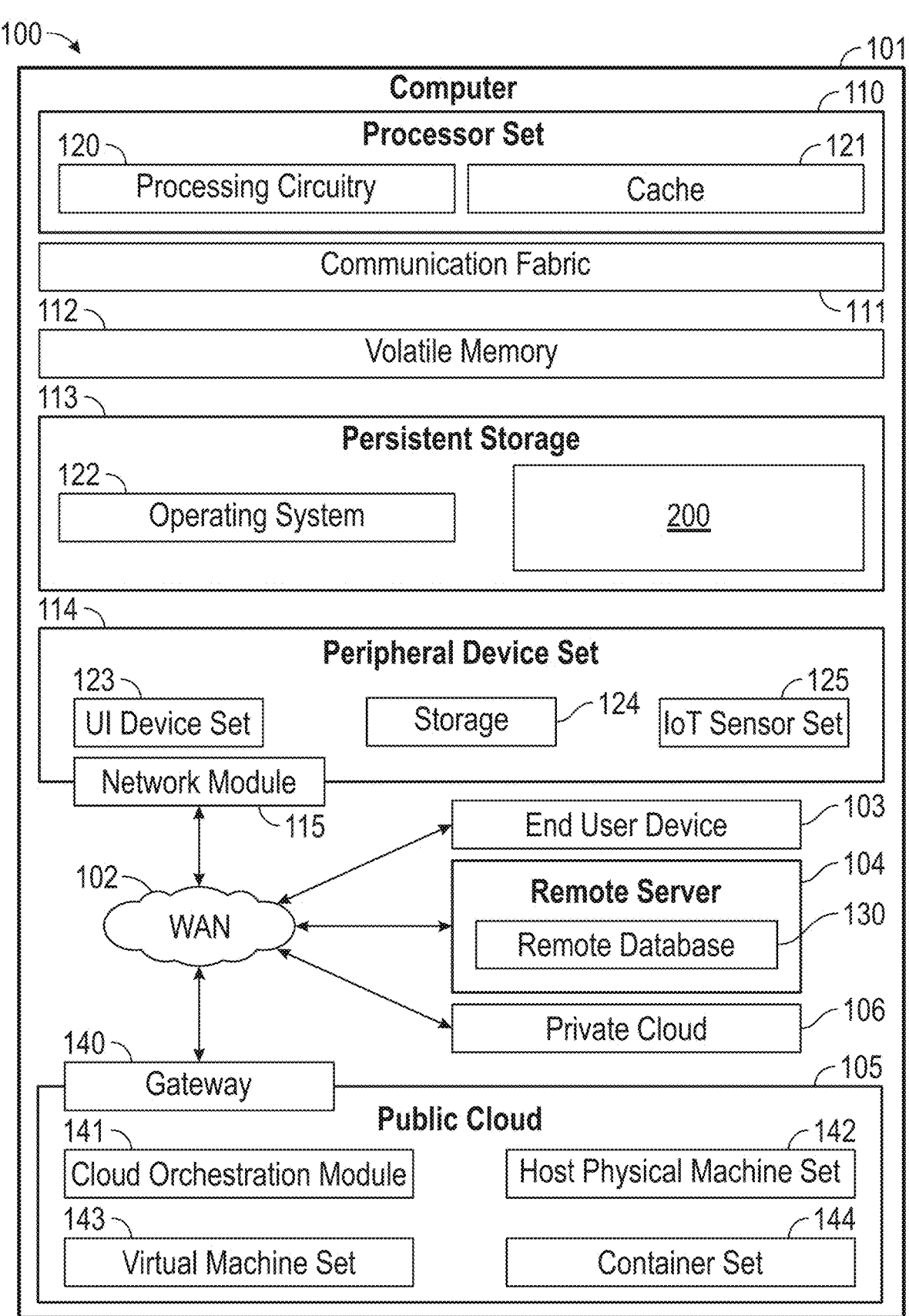
FIG. 7 depicts a computing environment according to an embodiment of the present invention.

FIG. 7 is a block diagram of an example high-level workflow for detecting and mitigating network attacks, in accordance with example embodiments. In one example embodiment, a check is performed to determine if an intrusion attack is detected (decision block 704). In one example embodiment, the intrusion detection is rules-based. If an intrusion attack is not detected (NO branch of decision block 704), the check is repeated (decision block 704); otherwise (YES branch of decision block 704), policy control is performed (decision block 708). In particular, a check is performed to compare whether the attack is valid and whether a creation of a snapshot is needed (decision block 708). If the attack is valid and a snapshot creation is needed (YES branch of decision block 708), a snapshot of the data under attack is taken (operation 712); otherwise (NO branch of decision block 708), the method ends.

Policies

The policies of the policy control module 404 define, for example, the decision rules for snapshot creation and includes, among others, the following policies:

maximum number of snapshots in a given duration (for example: a maximum of one snapshot in one minute);

only create a snapshot for a specified severity level of intrusion (for example: creating a snapshot only for an intrusion severity level of 1); and temporally sort snapshot commands by importance of the data under attack on the storage system 420.

Given the discussion thus far, it will be appreciated that, in general terms, an exemplary method, according to an aspect of the invention, includes the operations of determining whether a network attack is suspected (operation 608); in response to determining that the network attack is suspected, requesting, via a low latency link 436, a generation of a snapshot of volumes of data (operation 612); and generating the snapshot of the volumes of data while the volumes of data are blocked from access and prior to an occurrence of an effect of the network attack on the volumes of data (operation 636).

In one example embodiment, the risk of the network attack is evaluated (operation 604), wherein the determining whether a network attack is suspected is based on the evaluation. While depicted as separate operations in FIG. 5, in one or more exemplary embodiments, operations 604 and 608 could be visualized as being integrated as a single operation.

In one example embodiment, a snapshot manager 412 is informed of an identity of volumes of data potentially affected by the suspected network attack and an identity of corresponding severities, priorities or both (operation 616).

In one example embodiment, the identified volumes of data are sorted in accordance with the severities, the priorities or both to enable the generation of the snapshot data to be performed in an order based on the severities, the priorities or both (operation 620).

In one example embodiment, the volumes of data that are determined to be safe from attack are arranged at a tail of a command queue (operation 620).

In one example embodiment, a snapshot request is sent, via the low latency link 436, to a storage system 420 according to an order of the sorted volumes of data (operation 624).

In one example embodiment, the snapshot request includes a consistency group identifier, identifiers of the volume of data, or both.

In one example embodiment, the snapshot request is set to high priority in a storage system 420 (operation 628).

In one example embodiment, input to and output from the volumes of data are blocked in a corresponding consistency group (operation 632).

In one example embodiment, the input to and the output from the corresponding volumes of data are resumed after a capture of a snapshot of the volumes of data (operation 640).

In one example embodiment, a first completion acknowledgement is returned to a snapshot manager module 412 (operation 644) and a second completion acknowledgement is returned from the snapshot manager module 412 to an attack detection module 408 (operation 648).

In one example embodiment, the volume of data captured by the snapshot is verified as being unaffected by the suspected network attack (operation 652) and the volumes of data captured by the snapshot are restored after the suspected network attack.

In one aspect, a computer program product comprises one or more tangible computer-readable storage media and program instructions stored on at least one of the one or more tangible computer-readable storage media, the program instructions executable by a processor, the program instructions comprising determining whether a network attack is suspected (operation 608); in response to determining that the network attack is suspected, requesting, via a low latency link 436, a generation of a snapshot of volumes of data (operation 612); and generating the snapshot of the volumes of data while the volumes of data are blocked from access and prior to an occurrence of an effect of the network attack on the volumes of data (operation 636).

In one aspect, an apparatus comprises a memory and at least one processor coupled to the memory and operative to perform operations comprising determining whether a network attack is suspected (operation 608); in response to determining that the network attack is suspected, requesting, via a low latency link 436, a generation of a snapshot of volumes of data (operation 612); and generating the snapshot of the volumes of data while the volumes of data are blocked from access and prior to an occurrence of an effect of the network attack on the volumes of data (operation 636).

Refer now to FIG. 7.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as network attack mitigation system 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer

101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
determining whether a network attack is suspected;
in response to determining that the network attack is suspected, requesting, via a low latency link, a generation of a snapshot of volumes of data; and
generating the snapshot of the volumes of data while the volumes of data are blocked from access and prior to an occurrence of an effect of the network attack on the volumes of data, wherein generating the snapshot of the volumes of data comprises:
identifying, from the volumes of data, a plurality of volumes of data affected by the network attack and an identity associated with each of the plurality of affected volumes of data, the identity comprising at least one selected from the group consisting of:
(i) attack severity of the network attack associated with each affected volume of data; and
(ii) data priority of each affected volume of data;
sorting the plurality of affected volumes of data based on the identity of each of the plurality of affected volumes of data; and
sending, via the low latency link, a snapshot request to a storage system according to an order of the sorted volumes of data.

2. The computer-implemented method of claim 1, further comprising evaluating a risk of the network attack on a host system, wherein the determining whether the network attack is suspected is based on the evaluating of the risk of the network attack.

3. The computer-implemented method of claim 1, further comprising informing a snapshot manager of the plurality of affected volumes of data and the identity associated with each of the plurality of affected volume of data.

4. The computer-implemented method of claim 1, further comprising arranging volumes of data that are determined to be safe from attack at a tail of a command queue.

5. The computer-implemented method of claim 1, wherein the snapshot request includes at least one selected from the group consisting of a consistency group identifier and identifiers of the volumes of data.

6. The computer-implemented method of claim 1, further comprising setting the snapshot request to high priority in the storage system.

7. The computer-implemented method of claim 1, further comprising blocking input to and output from the volumes of data in a corresponding consistency group.

8. The computer-implemented method of claim 7, further comprising resuming the input to and the output from the corresponding volumes of data after a capture of the snapshot of the volumes of data.

9. The computer-implemented method of claim 1, further comprising returning a first completion acknowledgement to a snapshot manager module and returning a second completion acknowledgement from the snapshot manager module to an attack detection module.

10. The computer-implemented method of claim 1, further comprising:
verifying that the volumes of data captured by the snapshot is unaffected by the network attack; and
restoring the volumes of data captured by the snapshot after the network attack.

11. A computer program product, comprising:
one or more tangible computer-readable storage media and program instructions stored on at least one of the one or more tangible computer-readable storage media, the program instructions executable by a processor, the program instructions comprising:
determining whether a network attack is suspected;
in response to determining that the network attack is suspected, requesting, via a low latency link, a generation of a snapshot of volumes of data; and
generating the snapshot of the volumes of data while the volumes of data are blocked from access and prior to an occurrence of an effect of the network attack on the volumes of data, wherein generating the snapshot of the volumes of data comprises:
identifying, from the volumes of data, a plurality of volumes of data affected by the network attack and an identity associated with each of the plurality of affected volumes of data, the identity comprising at least one selected from the group consisting of:
(i) attack severity of the network attack associated with the affected volume of data; and
(ii) data priority of the affected volume of data;
sorting the plurality of affected volumes of data based on the identity of each of the plurality of affected volumes of data; and
sending, via the low latency link, a snapshot request to a storage system according to an order of the sorted volumes of data.

12. A system comprising:
a memory; and
at least one processor coupled to said memory and operative to:
determine whether a network attack is suspected;
in response to determination that the network attack is suspected, request, via a low latency link, a generation of a snapshot of volumes of data;
generate the snapshot of the volumes of data while the volumes of data are blocked from access and prior to an occurrence of an effect of the network attack on the volumes of data, wherein generation of the snapshot of the volumes of data comprises:
identify, from the volumes of data, a plurality of volumes of data affected by the network attack and an identity associated with each of the plurality of affected volumes of data, the identity comprising at least one selected from the group consisting of:
(i) attack severity of the network attack associated with the affected volume of data; and
(ii) data priority of the affected volume of data;
sort the plurality of affected volumes of data based on the identity of each of the plurality of affected volumes of data; and
send, via the low latency link, a snapshot request to a storage system according to an order of the sorted volumes of data.

13. The system of claim 12, wherein the at least one processor is operative to evaluate a risk of the network attack on a host system, wherein the determining whether the network attack is suspected is based on the evaluating of the risk of the network attack.

14. The system of claim 12, wherein the at least one processor is operative to inform a snapshot manager of the plurality of affected volumes of data and the identity associated with each of the plurality of affected volumes of data.

15. The system of claim 12, wherein the at least one processor is operative to set the snapshot request to high priority in the storage system.

16. The system of claim 12, wherein the at least one processor is operative to:

verify that the volumes of data captured by the snapshot is unaffected by the network attack; and restore the volumes of data captured by the snapshot after the network attack.

* * * * *